March 19, 1963  R. T. HURLEY ETAL  3,081,753
ROTARY COMBUSTION ENGINES
Filed March 10, 1960  4 Sheets-Sheet 1

INVENTORS
ROY T. HURLEY
MAX BENTELE
JOHN A. KIMBERLEY
BY
ATTORNEYS

March 19, 1963   R. T. HURLEY ETAL   3,081,753
ROTARY COMBUSTION ENGINES
Filed March 10, 1960   4 Sheets-Sheet 2

INVENTORS
ROY T. HURLEY
MAX BENTELE
JOHN A. KIMBERLEY
BY
Morgan, Finnegan, Durham & Pine
ATTORNEYS

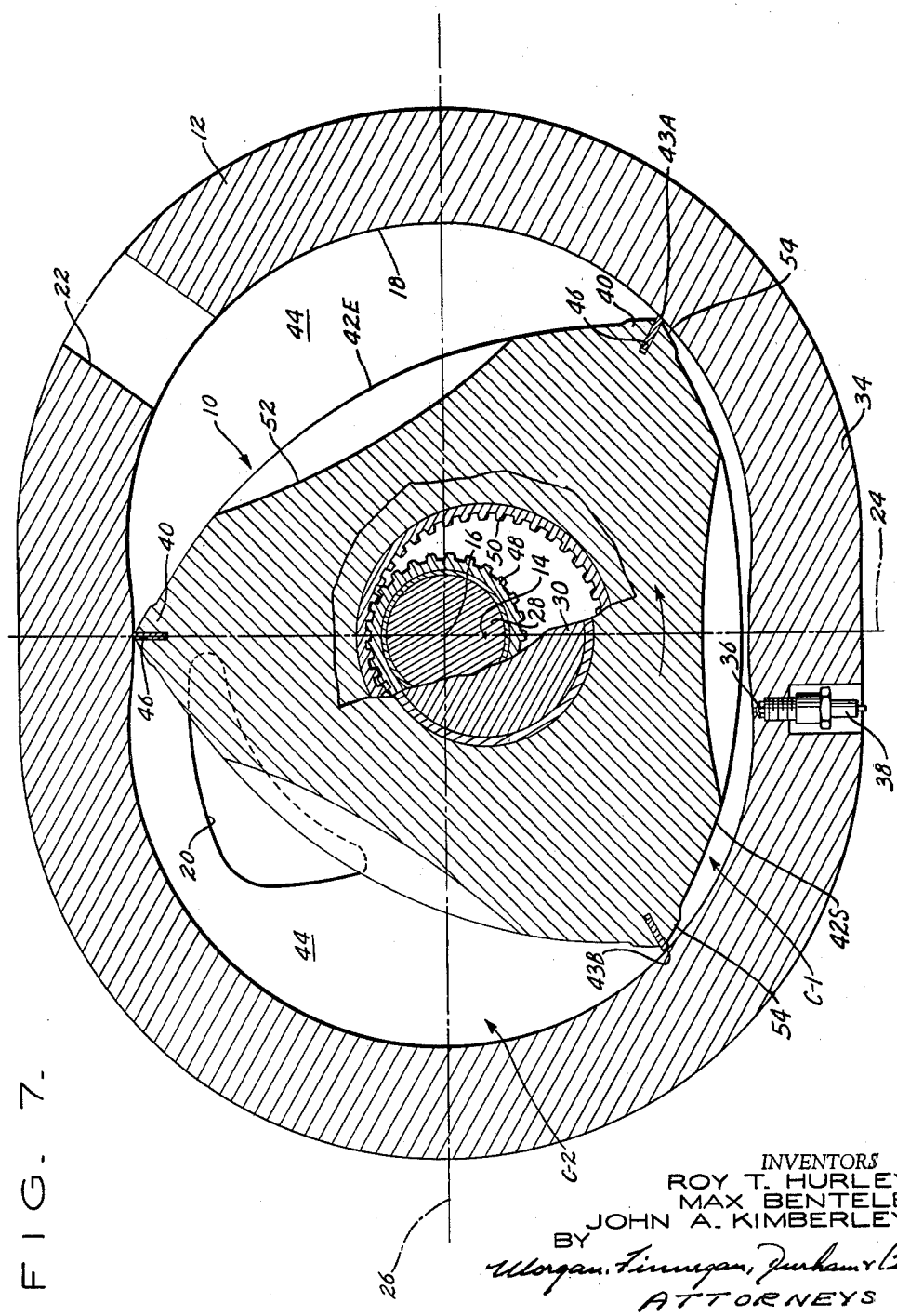

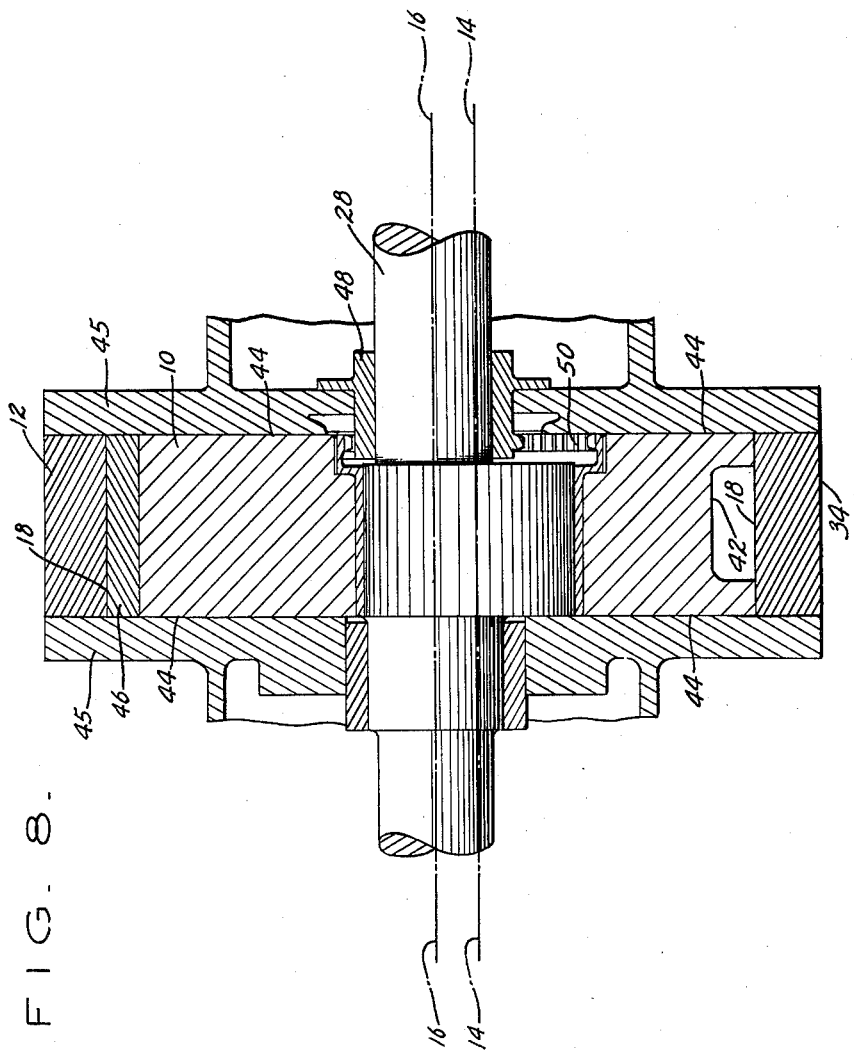

United States Patent Office 3,081,753
Patented Mar. 19, 1963

3,081,753
ROTARY COMBUSTION ENGINES
Roy T. Hurley, Saddle River, Max Bentele, Ridgewood, and John A. Kimberley, Wayne, N.J., assignors to Curtiss-Wright Corporation, a corporation of Delaware
Filed Mar. 10, 1960, Ser. No. 14,021
6 Claims. (Cl. 123—8)

The instant invention relates to rotating combustion engines and more particularly to an improved rotor and ignition system for such engines.

The present invention is particularly useful in rotating combustion engines which comprise an outer body having an axis, axially-spaced end walls, and a peripheral wall interconnecting the end walls; the inner surfaces of the peripheral wall and end walls form a cavity, and an inner body or rotor is mounted within the cavity between its end walls. The inner surface of the peripheral wall is preferably parallel to the axis of the cavity and, as viewed in a plane transverse to this axis, the inner surface preferably has a multi-lobed profile which approximates an epitrochoid. The axis of the rotor is parallel to but spaced from the axis of the cavity of the outer body, and the rotor has axially-spaced end faces disposed adjacent to the end walls of the outer body and a plurality of circumferentially-spaced apex portions. The rotor is rotatable relative to the outer body such that the apex portions substantially continuously engage the inner surface of the peripheral wall in sliding, gas-sealing contact to form between the outer surface of the rotor and the inner surface of the outer body a plurality of working chambers which vary in volume during engine operation, as a result of relative rotation between the rotor and the outer body. Such engines also include an intake passage for administering a fuel-air mixture to the chambers, an exhaust port for the chambers, and suitable ignition means so that during engine operation the working chambers of the engine undergo a cycle of operation which includes the four phases of intake, compression, expansion, and exhaust. This cycle of operation is achieved as a result of the relative rotation of the inner rotor and outer body, and for this purpose both the inner rotor and outer body may rotate at different speeds, but preferably the inner rotor rotates while the outer body is stationary.

For efficient operation of the engine, its working chambers should be sealed, and therefore an effective seal is provided between each rotor apex portion and the inner surface of the peripheral wall of the outer body, as well as between the end faces of the inner rotor and the inner surface of the end walls of the outer body.

One embodiment of the rotating combustion engine which has been successfully used in practice is an engine in which the multi-lobed inner surface of the outer body has the geometric form of an epitrochoid. The shape of the inner rotor is determined by approaching the maximum size rotor which the inner surface of the outer body can accommodate without creating interference contact between the outer surface of the rotor and the inner surface of the outer body. It is apparent that the theoretical maximum size rotor will also yield the theoretical maximum possible compression ratio for the engine. In this embodiment the shape of the rotor is a polygon or has the general configuration of a polygon with externally or internally curved arcuate sides. For proper functioning of the engine, only the apex portions of the rotor are in contact with the inner wall or surface of the stator.

For purposes of illustration the following description will be related to the present preferred embodiment of the engine in which the outer body is stationary, or a stator, the inner surface of which defines a two-lobed epitrochoid, and the rotor or inner body has three apex portions and is generally triangular in cross-section but has curved or arcuate sides. It is not intended that the invention be limited, however, to the form in which the outer body is a stator nor to the form in which the inner surface of the outer body approximates a two-lobed epitrochoid and the inner body or rotor has only three apex portions. In other embodiments of the invention the outer body may rotate at a fixed speed ratio relative to rotation of the inner body; also, the inner surface of the outer body may approximate an epitrochoid having one less lobe than the rotor, which is supported within the outer body for rotation, has apex portions.

In this description of the invention the geometric form of the contour of the rotor which will yield the theoretical maximum compression ratio and still be free to rotate will be termed the inner envelope of the epitrochoid stator, or, for brevity, the "inner envelope."

For practical purposes, the contour of the outer surface of the rotor is controlled by normal production tolerances which avoid excessive critical machining of parts for competitive manufacturing reasons. The present invention relates to the discovery that beneficial and unexpected results can be obtained by adding a small land or deposit of material to the working face of the rotor on both sides of each rotor apex while maintaining the non-critical production tolerance contour over the greater part of the outer surface of the rotor. This small land of material is raised and closely dimensioned to provide the minimum possible clearance between it and the inside wall of the stator when the engine is running hot.

In the present preferred embodiment of the invention the engine is provided with an ignition means, which is preferably a spark plug, and is preferably mounted in the peripheral wall of the outer body adjacent to the section of the inner wall of the outer body at which the expansion phase of the engine operation cycle begins. In this embodiment, since there is only one ignition means for the engine, that ignition means or spark plug must ignite a combustible mixture three times during every cycle of the engine, i.e. during one relative revolution of the rotor. Accordingly, it is apparent that this single spark plug is subjected to unusually heavy burdens which are substantially greater than those to which spark plugs are subjected in the conventional multi-cylinder internal combustion engine in general use today. Also, in contradistinction to the spark plug of a conventional four stroke cycle engine, the spark plug of the instant rotating combustion engine derives very little cooling benefit from being swept by a fresh intake charge. With the constant repetitive demands being made on the spark plug of the instant invention, rapid and efficient cooling of the spark plug electrodes becomes a vitally important desideratum, and the location and volume of the recess or cavity in which the spark plug is mounted in the peripheral wall of the outer body also assume critical importance. The discovery of the proper volume, location, and preferred shape of the spark plug cavity, and a spark plug having unusual heat conducting characteristics, and in combination with these features, the providing of a proximity of alignment between the inner wall of the outer body and the working face of the rotor adjacent to its apex portion as it passes the spark plug cavity, are important aspects of the present invention.

Unexpected beneficial results are achieved from the raised land on the rotor tip when this land is brought into approximate tangential relationship or alignment with the inner wall of the stator at certain critical portions of the engine cycle. Among the beneficial results which are to be achieved by the use of the raised land adjacent to the apex of the rotor in approximate alignment with the inside wall of the stator during critical portions of the rotor cycle are a flame-arresting effect, a relief of the load on the apex seals at critical points in the cycle, reinforcing the apex seals by increasing the supported length of the side of the seals, the quenching and cooling of hot gases in the spark plug cavity to prevent premature ignition, the pumping of cool gases into the spark plug cavity to further insure against premature ignition, and cooling of the apex seals by quenching and cooling hot combustion gases as they approach the seals but before they reach them.

In accordance with the foregoing, it is a primary object of the present invention to increase the performance and efficiency of rotating internal combustion engines by providing a raised area or land on the surface of the working face of the rotor immediately adjacent to the apexes of the rotor, the raised area being so closely dimensioned that it creates the minimum operating clearance between it and the inner surface of the outer body which is sufficient to prevent interference contact.

It is also an object of the instant invention to provide a combination of means for rapidly and efficiently cooling the spark plug, the spark plug cavity, and the gases within the cavity by providing a spark plug having unusual heat conducting characteristics, a spark plug cavity having a preferred shape and preferred limits of volume and location, and a proximity of alignment and close clearance between the working face of the rotor adjacent to its apex portion and the inner wall of the outer body as the apex portion passes by the spark plug cavity.

It is another object of the present invention to relieve the load on the apex seals in the rotor by providing a long narrow restricted flow path between the combustion chamber and the adjacent compression chamber at a time when differential pressure between the two chambers is at or near a maximum. The restricted long narrow flow path is created by the very close approximate alignment of the rotor land with the inner surface of the stator wall. This flow path restricts the flow of gases under pressure and relieves the direct gas pressure load on the apex seals at critical points in the engine cycle.

Another object of the instant invention is to provide means having a quenching or flame-arresting effect to prevent a fresh charge undergoing the intake or compression phase of the cycle from being prematurely ignited by leakage of burning gases past the seal or through the spark plug cavity. The raised surfaces on the rotor faces adjacent to the apexes when in close proximity of alignment with the inner surface of the stator housing form a confined space between the surfaces of these two large and relatively cool masses of metal, i.e. the rotor and stator housing, at certain times in the engine cycle. Any burning gases which pass through this confined space will be chilled and quenched by its cool metal walls. During intake the fresh charge is protected from premature ignition by quenching these burning gases before their possible leakage past the apex seal; and during compression, by quenching them after possible leakage.

Another object of the present invention is to provide means on the rotor which acts as a quenching and cooling surface to quench and cool burning residual combustion gases in the spark plug cavity to insure against premature ignition of a fresh charge entering the combustion phase.

Another object of the present invention is to provide a raised land on the rotor which creates a purging and cooling effect in the spark plug cavity by first locally quenching and cooling the burning gases in the combustion chamber and then pumping or urging these cool gases into the spark plug cavity as the rotor land passes by the cavity, thereby further insuring against premature ignition of the fresh charge entering the combustion phase of the cycle.

Another object of the present invention is to provide a spark plug capable of rapidly and efficiently conducting heat away from its electrode end and one which avoids abrupt changes in its temperature gradient to prevent failure or weakening of its parts from a combination of thermal and mechanical stresses.

Another object of the present invention is to provide a spark plug cavity within the stator wall of sufficiently small volume to insure that substantially all the hot gases collecting within the cavity can be cooled by contact with the relatively cool surface of the raised land and mixture with cool gases pumped or urged into the cavity from the surface of the land to lower the temperature of the gases sufficiently to prevent premature ignition of a new charge.

A further object of the instant invention is to provide raised additional metal at the rotor apex to increase the guided length of the side of the apex seal and add to the stability of the seal. The additional metal makes it possible to provide a deeper slot for the apex seal and improve the guidance, stability, durability, and sealing characteristics of the apex seal.

A still further object of the present invention is to provide cooling of the apex seal by quenching and cooling of hot burning gases approaching the apex seal before they reach the apex seal.

Another aspect of the instant invention is the discovery that the beneficial results of the invention can be obtained by creating the raised land adjacent the rotor apex over only a small area of the contour of the rotor face. The small surface area of the raised land greatly reduces the chances for engine failure to occur through adventitious contact of the rotor face with the stator wall. The results of the invention can be achieved even if the surface area of the raised land is planar. The straight or planar land can be sufficiently small that it will approximate a curve in practice, and its planar characteristic will permit it to be constructed by a straight angle cut in manufacturing, thereby greatly reducing the cost of production.

Broadly described, the present invention comprises a raised land on the rotor of a rotating combustion engine adjacent to the apexes of the rotor, the raised land being in close proximity of alignment with the stator wall of the engine during critical portions of the cycle, such as when differential pressures are at or near a maximum between the expansion and compression chambers, and the invention also includes the combination of the raised land with ignition means having unusual heat conducting characteristics and the provision of a cavity or recess for the ignition means having preferred limits of volume and location, and a preferred shape.

Additional objects and advantages of the invention will be set forth in part in the description which follows and in part will be obvious from the description, or may be learned by practice of the invention, the objects and advantages being realized and attained by means of the instrumentalities and combinations particularly pointed out in the appended claims.

The invention consists in the novel parts, constructions, arrangements, combinations and improvements shown and described.

The accompanying drawings which are incorporated in and constitute a part of this specification, illustrate one embodiment of the invention and together with the description, serve to explain the principles of the invention. In a number of the drawings the raised surfaces are exaggerated for clarity.

In the accompanying drawings illustrating the mechanical aspects of the present invention, it is believed that the showing of the fundamental construction, functions, originality and advantages of the invention may be more easily understood when certain details of practical construction are omitted, where these details form no part of the claimable invention, are well-known to those skilled in the art, and could be incorporated in the present invention by any skilled workman. These details may consist of means for lubrication, such as, oil cups, grooves, reservoirs, seals, wipers, and O-rings; means for reduction of friction, such as, bushings, ball bearings, and roller bearings; means for sealing off various spaces or areas to confine fluid pressures to their functional locale, such as, packing, packing glands, O-rings and gaskets; constructional details of fluid conducting means, such as, tube or pipe joints, unions, and elbows including supporting and securing means; and such other comparable means and devices that may be omitted for the sake of clarity.

Of the drawings:

FIG. 7 is a plan view of the stator in section and showing the rotor inside the stator;

FIG. 8 is a central vertical section of the main portion of the engine showing the rotor within the stator.

Figure 1:
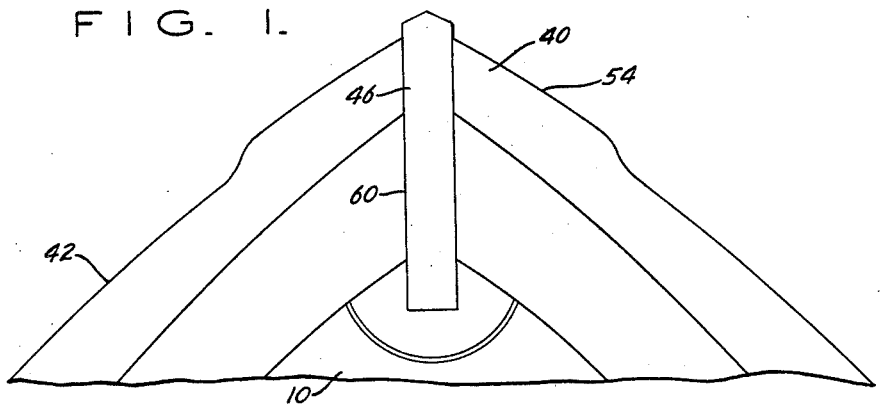
FIG. 1 is a fragmentary enlarged view of the rotor showing its apex portion with the raised surfaces.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings, and in which (FIGS. 7 and 8) a generally triangular rotor 10 having arcuate sides is eccentrically supported for rotation within an outer body 12 on an axis 14 which is eccentric to and parallel to the axis 16 of the outer body.

The curved inner surface 18 of the outer body 12 has the geometric shape of an epitrochoid and may be described as having two arched lobe-defining portions, or lobes. An intake port 20 is arranged to communicate with one lobe defined by the inner surface 18, and an exhaust port 22 is arranged to communicate with the other lobe. The center of the epitrochoid defined by the inner surface 18 of the outer body 12 coincides with the axis 16 of the outer body. There are two points of least radius on the epitrochoid from its center 16. A line which connects these two points of least radius and passes through the center of the epitrochoid is designated the minor axis 24 of the epitrochoid. Similarly, the epitrochoid has two points of greatest radius, and a line connecting these two points and passing through the center of the epitrochoid is designated the major axis 26 of the epitrochoid.

As embodied, it is apparent that the minor axis 24 divides the epitrochoid into two halves. For convenience, the half or lobe which communicates with the exhaust port may be called the exhaust lobe and the half or lobe which communicates with the intake port may be called the intake lobe.

The general shape of the rotor 10 approaches as a limit the shape of the inner envelope of the epitrochoid defined by the inner surface 18 of the outer body 12. In practice, the rotor shape is made less than the theoretical maximum of the inner envelope to preclude interference between rotor and outer body during operation. In the present embodiment the rotor 10, although the major portion of its working face is made less than the theoretical maximum, still retains the same general configuration as the inner envelope at the portions of the working faces immediately adjacent to the edges 43 of the apexes 40, as will be more particularly pointed out in the description which follows.

As embodied, the crankshaft 28 of the engine is concentric with the center of the epitrochoid defined by the inner surface 18. The crankshaft 28 includes an eccentric 30 having an axis eccentric and parallel to the crankshaft axis.

The rotor 10 is mounted to rotate on the eccentric 30, suitable counterweights (not shown) are keyed to portions of the crankshaft 28 and serve to counterbalance the eccentric 30 and the rotor 10 when the engine is in operation. The peripheral wall 34 of the outer body is provided with a well or cavity 36 of generally circular cross-section within which a spark plug 38 is mounted and so disposed that its electrodes communicate with the cavity 36. In operation, the rotor 10 performs a planetary rotary movement in a counterclockwise direction (as viewed in FIGS. 2 and 7), with respect to the outer body or stator 12.

The generally triangular rotor 10 is provided with three apexes 40 which in turn have appropriate sealing means or apex seals 46 to effectively seal the variable volume working chambers which are defined by the working faces 42 of the rotor, the curved inner surface 18, and the inner side surfaces 44 of the end walls 45 of the outer body. The sealing means seal the variable volume working chambers from each other as the rotor rotates during operation, and the apex seals 46 are in substantially continuous, sliding, and gas-sealing engagement with the inner surface 18 of the outer body 12 as the rotor rotates.

If it were not necessary to provide a slot 60 in the rotor apexes 40 to receive the apex seals 46, it is apparent that the working faces 42 would intersect and form a line or edge 43 (see broken line in FIG. 6) at each apex. It is also apparent that with respect to a given working face there will be both a leading edge and a trailing edge dependent upon the direction of relative rotation of that working face. For example, the working face 42S opposite the spark plug 38 in FIG. 7 has both a leading edge 43A and a trailing edge 43B which are determined by the relative rotation of the rotor, which in FIG. 7 is counterclockwise. It should be noted, however, that with respect to the working face 42E opposite the exhaust port 22, the edge 43A is a trailing edge, not a leading edge. Accordingly, for correct definition the edges 43 must be referred to specific working faces, such as 42S and 42E (FIG. 7).

As a convention in describing the rotary combustion engine and for convenience in designating various of its parts, the terms "upstream" and "downstream" are sometimes used to precisely describe the location of parts relative to each other. In completing a cycle of the engine, the gases contained in one of the variable volume working chambers flow around the inner surface 18 from intake port 20 to exhaust port 22 (FIG. 7) and describe a roughly circular path. Of course, the general direction of gas flow is the same as the direction of rotor rotation; and in the present embodiment, as shown in FIG. 7, both gas flow and rotor move in a counterclockwise direction. Accordingly, in describing parts of the engine, a direction against gas flow or rotor rotation is "upstream" and a direction with gas flow of rotor rotation is "downstream."

Figure 2:
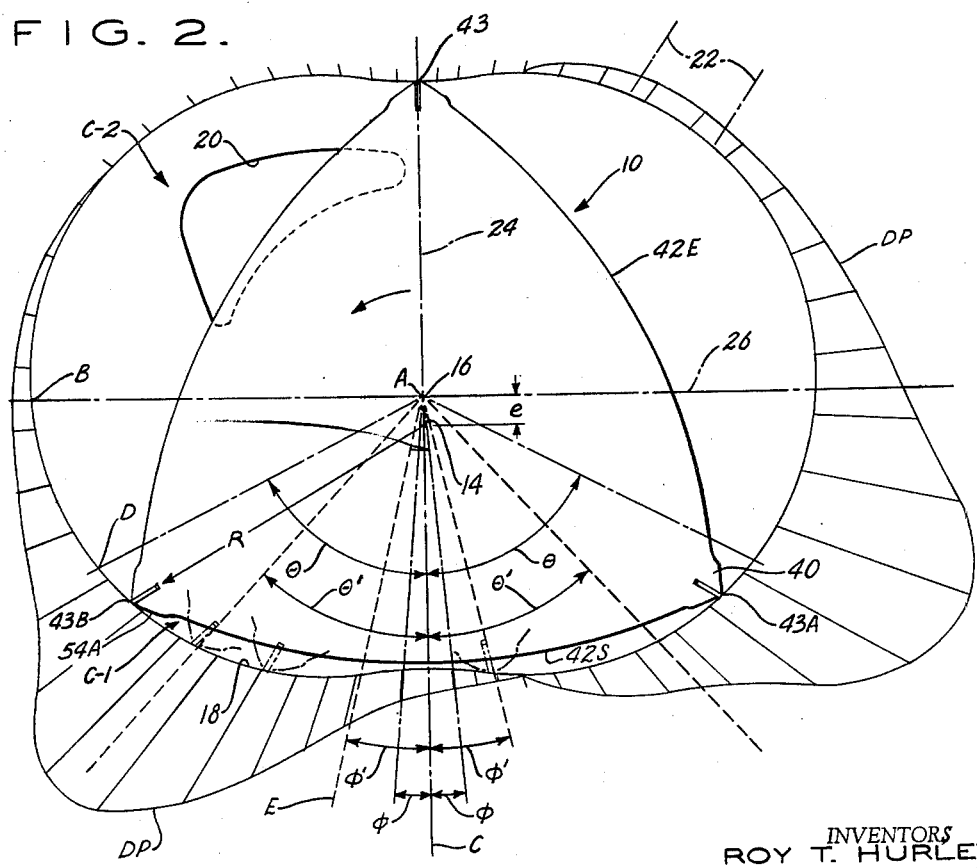
FIG. 2 is a diagrammatic view of the engine showing the rotor positioned within the stator, successive positions of one apex of the rotor, and variation of differential pressure across an apex seal at various positions of the apex, the curve of differential pressure being designated as DP.

During each cycle of the engine each working face of the rotor will pass through two top dead center positions. One of these positions is "top dead center-compression," and the other is "top dead center-exhaust." As shown in FIGS. 2 and 7, the working face 42S is in the "top dead center-compression" position, and when it has moved around to a similar position on the opposite side of the major axis 26, it will be in the "top dead center-exhaust" position.

Secured to one end wall 45 of the outer body 12 is an externally toothed gear 48 which is in mesh with the teeth of an internally toothed gear 50 carried by the rotor 10. In the present embodiment the ratio of the intermeshing teeth between the rotor gear 50 and the combined bearing and gear 48 is 3:2, so that for every revolution of the rotor about its own axis the crankshaft 28 rotates three times in the same direction.

The working faces 42 of the rotor have channels 52 which extend over a substantial area of the face 42. These channels permit the hot and burning combustion gases to pass freely from one lobe-defining portion of the outer body 12 to the other when the rotor is in or near top dead center-compression position as shown in FIG. 7. The size and depth of the channels 52 also function to determine the effective compression ratio for the engine.

Figure 6:
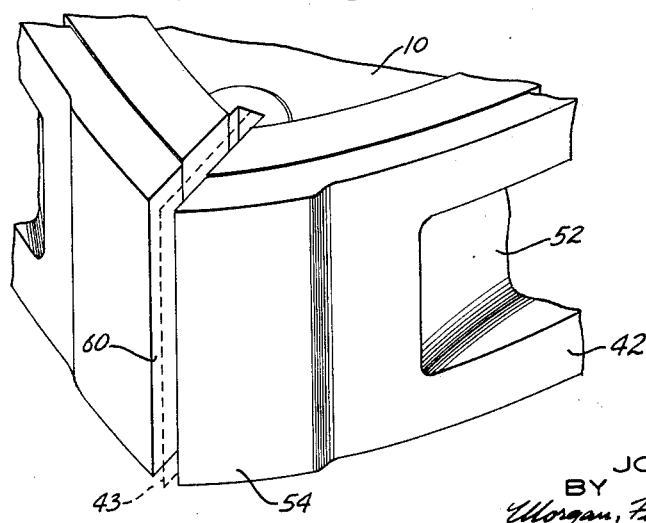
FIG. 6 is a fragmentary perspective view of the rotor showing one apex and the raised lands adjacent to it.

In the present invention the rotor 10 is provided with a raised surface area or land 54 on its working face 42 immediately adjacent to the edges 43, and the lands or raised surfaces 54 preferably extend the entire width of the rotor as shown in FIG. 6. It has been discovered that the beneficial results of the invention can be obtained, however, by extending the raised surfaces 54 for over only a small portion of the total length of the working faces 42 immediately adjacent to the edges 43.

In the present embodiment the length of the raised surfaces 54 is small enough in comparison to the curvature of the contour of the working faces 42 that in machining the rotor for production the land can be made with a straight angle cut and does not need to maintain the curvature of the general contour of the rotor. Even though the land can be machined by straight angle cut, the clearance between the land of the inner surface 18 of the outer body 12 when the engine is in operation is critical and represents a very small value. In one embodiment of the invention a satisifactory operating gap between the rotor raised surface 54 and the inner surface 18 has been found to be not more than about 0.4 percent of the radius R measured from the center 14 of the rotor 10 to an edge 43 (FIG. 2).

In operation of the engine, as the rotor turns on its own axis and its apexes 40 trace their paths virtually coincident with the inner surface 18 of the outer body 12, three working chambers are defined between the working faces 42 of the rotor and the inner surface 18 and the inner side surfaces 44 of the end walls 45 of the outer body, and these working chambers vary in volume as the relative position of the rotor changes as it rotates on its axis and as its axis describes an eccentric path around the axis of the outer body 12 and crankshaft 28. It will be apparent that at certain portions of the engine cycle as the working chambers undergo the various phases of intake, compression, expansion, and exhaust, the rotor raised surfaces 54 will at times be in very close proximity of alignment with the inner surface 18 of the outer body, and at other portions of the cycle will be much less nearly in alignment or will be out of alignment or tangential relaitionship with the inner surface 18.

Another important feature of the instant invention is derived from the fact that the rotor lands or raised surfaces 54 are in the above-described position of approximate alignment with the inner surface 18 during those portions of the cycle when unexpected and beneficial results may be derived from the proximity of alignment relationship. Accordingly, when differential pressures between the chamber undergoing combustion and expansion C-1 (FIG. 2) and the chamber undergoing intake and compression C-2 are at or near a maximum value, the raised surface 54A will be in close alignment with the inner surface 18 and the combination of the raised surface 54A and the inner surface 18 will form a long continuous restricted flow path for pressurized gases attempting to flow from chamber C-1 to chamber C-2 during a critical point in the engine cycle when the differential pressure between chamber C-1 and C-2 is at or near a maximum. The long restricted flow path provided by the two metal surfaces 54A and 18 acts as a restriction in series with the apex seal 46 and relieves the direct gas pressure load on the apex seal. Since effective sealing at the apexes 40 of the rotor is essential for proper functioning of the engine, the reinforcing of these seals 46 at a time when the load on them is at a peak is an important result of the instant invention.

The relative differential pressures which exist at different points in the engine cycle as the apexes 40 sweep by the various points along the curve of the epitrochoid formed by the inner surface 18 are shown in FIG. 2 by the curve plotted outside the epitrochoid and designated DP. It can be seen from FIG. 2 that differential pressures between chambers C-1 and C-2 are highest at a time when the apex separating these two chambers is moving through the quadrant BAC. It can also be seen from FIG. 2 that during the travel of the edge 43B through the sector DAE the raised surface 54A adjacent to the edge 43B is in close approximate alignment with the inner surface 18. It is when the edge 43B is in the general vicinity of point D that the charge is ignited, so that the close alignment relationship is preserved during the critical period shortly before, during, and for a time after ignition.

An important result of the invention is obtained from the maintenance of the close alignment relationship when the charge is ignited and during combustion. As will be seen in FIG. 3, the raised surface 54A of the rotor tip and the inner surface 18 act to provide two large and relatively cool surfaces with a narrow and confined space between them. These cool surfaces provide a combination of cooling and quenching or flame-arresting effects as hot and burning gases are forced to pass between them in attempting to reach the lower pressure area on the other side of the apex seal 46. The combined cooling and quenching or flame-aresting effects serve to insure against premature ignition which might otherwise be caused if hot and burning gases leaked past the apex seal 46 or through the spark plug cavity into the compression chamber C-2 (FIG. 2) where a fresh charge is undergoing the intake and compression phases of the engine cycle. This effect of quenching and cooling the gases before they reach the apex seal is achieved by the inner surface 18 and the rasied surface 54A on the downstream side of edge 43B (FIG. 2) while chamber C-2 is undergoing intake.

Similarly, as combustion proceeds and edge 43B passes across the minor axis 24 (see broken line illustration of apex portion of rotor in FIG. 2), the fresh charge, now undergoing compression in chamber C-2, will be protected from premature ignition by combustion gases after possible leakage past the apex seal 46 by the quenching and cooling of these gases between the closely aligned inner surface 18 and raised surface 54 on the upstream side of edge 43B.

When the edge 43B (FIG. 2) is on the upstream side of the minor axis, a still further beneficial result is obtained from the close proximity of alignment relationship between the the inner surface 18 and the raised surface 54A during ignition and combustion. This result is the cooling of the apex seal 46 by the quenching and cooling of the hot burning gases between the relatively cool metal surfaces of the rotor land and the inner surface so that these gases are cooled as they approach the seal and are relatively cool upon reaching it.

As the raised surface 54 sweeps past the spark plug cavity 36, the relatively cool surface of the land 54 acts as a heat conducting surface which removes heat from the hot gases which are present in the spark plug cavity and reduces the temperature of these gases below the critical point at which they would ignite the fresh charge by the time the apex seal 46 passes the cavity 36. To achieve the maximum benefit in quenching and cooling of combustion gases within the spark plug cavity 36 by the raised surface 54, a preferred configuration as to shape and preferred limits as to volume and location of the cavity have been determined.

Figure 3:
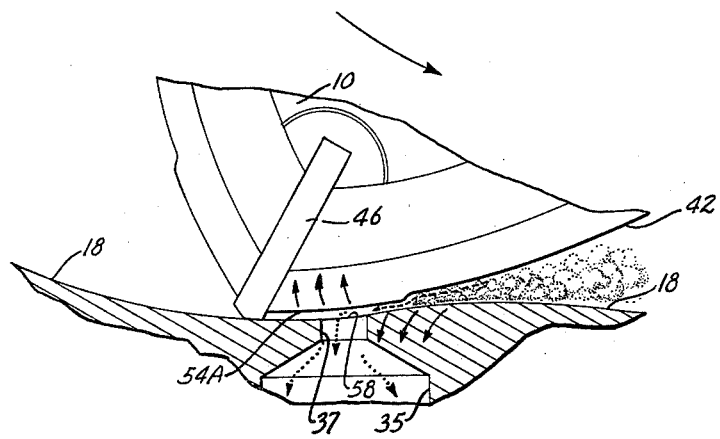
FIG. 3 is a fragmentary enlarged view of the rotor and stator wall depicting the raised land on the rotor and showing the rotor apex in a position just prior to passing the spark plug cavity in the stator wall.
Figure 4:
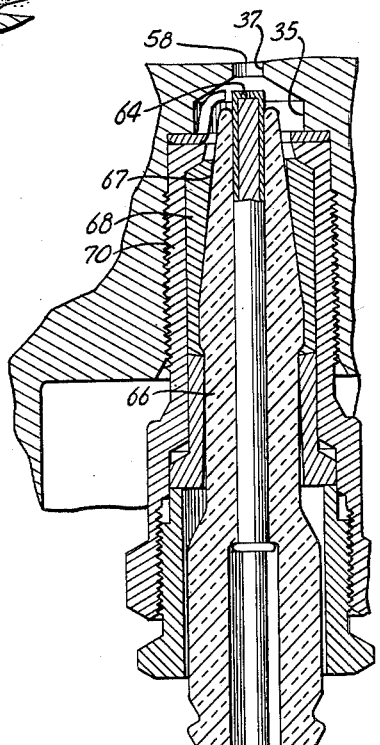
FIG. 4 is a central vertical section of a spark plug for use in the present invention.
Figure 5:
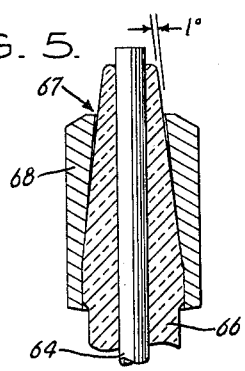
FIG. 5 is a central vertical section of the ceramic portion and metal sleeve of the spark plug, which are shown separately to clearly depict their contours.

As to shape, the preferred shape is achieved when the cavity includes a pair of interconnected concentric apertures formed in the peripheral wall 34 of the outer body 12. As shown in FIGS. 3 and 4, the walls of the outer aperture 35 slope to meet the inner aperture 37, and the outer aperture accommodates the spark plug 38. The inner aperture 37, which is of substantially smaller cross section, forms a restricted access from the spark plug electrodes to the working chamber of the engine.

As to volume, the volume of the cavity 36 between the spark plug and the inner surface of the peripheral wall 34 should be small, and may even be zero; the preferred volume includes up to but not more than about .06 cu. in.

Obviously, the spark plug location must be chosen for effects other than those provided by the raised surface. It has been determined, however, that to obtain the maximum benefit of cooperation of spark plug location with the raised surfaces, the spark plug should be located in one of two areas of the inner surface 18 subtended by the angle $\theta-\phi$ on either side of the compression end A.C. of the minor axis 24. The angle $\theta-\phi$ is determined by subtraction of the angle $\phi$ from the angle $\theta$, where $\phi$ and $\theta$ are both measured from either side of the compression end A.C. of the minor axis 24 and have their vertexes coincident with the axis 16 of the epitrochoidal inner surface 18 (see FIG. 2).

The area or range of spark plug locations which will permit obtaining the maximum cooperative benefit from the raised surfaces may thus be stated as the portion of the inner surface subtended by the angle $\theta-\phi$ on either side of the compression end of the minor axis. Both $\theta$ and $\phi$ may be expressed as functions of K where K is defined by the relationship:

$$K=\frac{R}{e}$$

In the above expression for K, R is the radius of the rotor 10 for the distance from the rotor axis 14 to an edge 43 (FIG. 2), and $e$ is the eccentricity of the rotor axis 14 from the axis 16 of the outer body 12, or the distance from axis 14 to axis 16 (FIG. 2).

A series of useful engines may be produced in which the approximate epitrochoid of the inner surface 18 will vary somewhat in shape and, of course, the rotor will also vary in shape since its approximate configuration is determined by the "inner envelope" of the epitrochoid. As the shapes of the epitrochoids vary, the value of K will also vary. A fairly typical value of K for a rotating combustion engine is, $K=7$, but useful engines can be constructed having values of K both above and below the value 7 depending upon the application of the engine. With these considerations understood, $\theta$ and $\phi$ may be expressed as follows:

$$\theta=18.4(K-2.3)-(K-2.3)^2$$
$$\phi=3(K-2.3)-(K-2.3)^{1.4}$$

Other factors, however, such as good combustion efficiency, dictate an even more prefererd and narrower range of spark plug locations. This range is embraced in two areas of the inner surface 18 subtended by the angle $\theta'$ and $\phi'$ on either side of the compression end A.C. of the minor axis 24. The areas between $\theta'$ and $\phi'$ are contained within the larger areas between $\theta$ and $\phi$. Like the angle $\theta-\phi$, the angle $\theta'-\phi'$ is determined by subtracting $\phi'$ from $\theta'$ where $\phi'$ and $\theta'$ are measured from either side of the compression end A.C. of the minor axis 24, as shown in FIG. 2. The angles $\theta'$ and $\phi'$ are symmetrical on both sides of the compression end A.C. of the minor axis 24 and may, like $\theta$ and $\phi$, also be expressed as functions of K as follows:

$$\theta'=14(K-2.3)-(K-2.3)^2$$
$$\phi'=5.5(K-2.3)-(K-2.3)^{1.6}$$

A. For spark plug locations between $\phi$ and $\theta$ upstream of the minor axis, the raised surfaces provide the following benefits:

(1) Effectiveness of the apex seal is increased.

(2) Flame seeking to get past the apex seal is arrested.

(3) Hot gases are cooled as they approach the apex seal and before they reach it.

(4) Flame is quenched and residual hot gases are cooled in the spark plug cavity as the relatively cool raised surface sweeps past.

(5) Cool gases are pumped into the spark plug cavity and the cavity is thereby purged of hot gases.

B. For spark plug locations between $\phi$ and $\theta$ downstream of the minor axis, the raised surfaces provide the advantages and benefits which follow:

(1) Flame seeking to leak past the apex seal in the area where differential pressure is against rotation, or upstream, is arrested. Although differential pressure is low, seal bouncing may occur in this area, and accordingly, flame arresting becomes very important.

(2) Effectiveness of the apex seal is increased.

(3) Hot gases are cooled as they approach the apex seal and before they reach it.

(4) Flame is quenched and residual hot gases are cooled in the spark plug cavity as the relatively cool raised surface sweeps past.

C. For spark plug locations between $\phi'$ and $\theta'$ upstream of the minor axis, the effects listed under item A above, particularly effects 4 and 5, are greatly increased and make this area more favorable for spark plug location from this standpoint as well as from the standpoint of combustion efficiency.

D. Similarly, for spark plug locations between $\phi'$ and $\theta'$ downstream of the minor axis, the effects listed under item B above, particularly effect 4, are greatly increased and make this area more desirable for spark plug location.

As shown in FIG. 2, the raised surface 54A on the downstream side of the apex seal 46 will act as a quenching surface when the spark plug cavity 36 is located on one side of the minor axis 24, whereas the raised surface 54B on the upstream side of the apex seal will act as the quenching surface when the spark plug cavity is located on the other side of the minor axis.

By having the raised surface 54 on the main surface of the working face 42 (FIG. 3), a still further beneficial result is provided by the instant invention. The manner in which this result is achieved is depicted in FIG. 3 which shows the rotor at an instant just prior to the passing of the apex seal 46 past the spark plug cavity 36 with the rotor rotating in a counterclockwise direction. The relatively cool metal surface of the raised land 54 moving in a forward direction into the hot gases burning in the combustion chamber and also moving in close proximity of alignment to the inner surface 18 creates a combination of conditions which result in the cooling and purging of the hot gases contained in the spark plug cavity 36. As may be seen in FIG. 3, the unbroken arrows show the heat being conducted from the hot gases through the raised surface 54 and the inner surface 18, and the broken arrows show the flow of these gases as they are forced to pass between the relatively cool surfaces of the raised land 54 and the inner surface 18. At the same time the raised surface 54 acts together with the apex seal 46 much as an impeller on a pump to push and force the gases up into the spark plug cavity 36 where they mix with the hot gases in the cavity to reduce their temperature at a critical point in the cycle just before the apex 40 of the rotor 10 sweep past the mouth 58 of the spark plug cavity 36. Cooling the hot gases in the spark plug cavity 36 greatly helps to insure that the fresh charge entering the combustion cycle will not be prematurely ignited by residual hot gases within the spark plug cavity 36.

A still further beneficial result obtained from the raised land 54 at the apex portions of the rotor is that the raised land 54 provides additional metal at the rotor apexes 40 (FIG. 1), whereby the length over which the apex seal 46 is supported and guided is beneficially increased. Because of eccentric forces and bearing tolerances, it is apparent that the apexes of the rotor will not maintain an absolutely uniform clearance from the inner surface 18 as they trace their paths around the inner surface 18 during operation of the engine. Accordingly, the apex seals are spring loaded by leaf spring 62 so that they will be maintained in intimate contact with the inner surface 18 but still be free to move in and out or up and down in the slots 60 as the rotor rotates on its axis around the inner surface 18. By increasing the guided length afforded by the slot 60 along the sides of the seals 46, the raised surfaces 54 add to the stability of the apex seal strip 46. The improved guidance and stability of the seals in turn increase their durability, enhance their sealing characteristics, and tend to prevent vibration and chattering of the seals within the slots.

It is obvious from the general construction of the engine of the present invention that the spark plug 38 is under continuous heavy burdens in providing the ignition means to ignite a combustible mixture three times during every cycle of the engine. Accordingly, the beneficial features and results of the present invention combine toward a common objective in one sense. This objective is to provide adequate and efficient cooling of the spark plug 38, spark plug cavity 36, and the areas of the outer body 12 and the combustion chamber C–1 immediately surrounding the location of the spark plug. As described earlier, the raised surface 54 helps to achieve proper and efficient cooling of the spark plug in various ways. In reinforcement of the cooling features provided by the raised surface 54, the spark plug 38 itself (FIG. 4) is provided with a metal sleeve 68 having a configuration which provides rapid and efficient heat conduction and acts to draw heat away from the electrodes 64 at the working end of the plug.

In its basic structure the spark plug 38 is conventional and includes an inner ceramic section 66 surrounding the center electrode 64 and providing electrical insulation, a metal sleeve 68 surrounding the ceramic section 66 and fabricated from a metal having good heat conducting properties; the heat conducting metal sleeve 68 is in turn surrounded by an outer metal casing 70 and is in good heat conducting contact with the casing 70 throughout its length. The ceramic section 66 surrounding the center electrode 64 and the metal sleeve 68, however, are not in tight heat conducting contact throughout the length of the metal sleeve. At room temperature there is a finely tapered gap 67, of the order of magnitude of one degree, between the ceramic section 66 and the metal sleeve 68 for a slight distance at their electrode ends. This finely tapered gap 67 comprises an important part of the present invention. If the metal sleeve 68 were in tight mechanical contact with the ceramic section 66 at its hot end, the ceramic section would tend to fail by breaking or shearing off at the first point of juncture between the two; and this failure was found to occur in practice. The finely tapered gap 67, however, minimizes the mechanical pressure of the sleeve against the ceramic section and the thermal stress arising from the abrupt change in the temperature gradient of the ceramic section 66 when it meets the heat conducting metal sleeve 68. The abrupt change in the temperature gradient of the ceramic section 66 has been almost eliminated by providing the finely tapered air gap. The air gap slows down the rate of heat conduction from the ceramic section to the metal sleeve, and at the same time it provides room for thermal expansion at the hot end of the ceramic section without a comparable and destructive increase in mechanical pressure. The gradual change of temperature in the ceramic section made possible by the air gap has greatly reduced thermal and mechanical stresses in the section and contributed to an outstanding improvement in durability and dependability of spark plugs in the rotating combustion engine.

The invention in its broader aspects is not limited to the specific mechanisms shown and described, but also includes within the scope of the accompanying claims any departures made from such mechanisms which do not depart from the principles of the invention and which do not sacrifice its chief advantages.

What is claimed is:

1. A rotary combustion engine having a cycle which includes the four phases of intake, compression, expansion, and exhaust, the engine comprising an outer body having spaced end walls and a peripheral wall interconnecting the end walls to define, between these walls, a cavity having an axis along which the end walls are spaced, a rotor received within the outer body cavity and supported for relative rotation with respect to the outer body with the axis of the rotor being laterally spaced from but parallel to the axis of the outer body cavity, the rotor having axially-spaced end faces disposed adjacent to and in sealing engagement with the end walls and a plurality of circumferentially-spaced apex portions, each apex portion having seal means disposed in sealing engagement with the inner surface of the peripheral wall to form a plurality of working chambers between the rotor and outer body which vary in volume upon relative rotation of the rotor and outer body, the rotor having working faces interconnecting apex portions and extending from one apex portion to an adjacent apex portion, the inner surface of the peripheral wall of the outer body having a plurality of regions disposed at a minimum radius from and parallel to its axis, the working faces of the rotor comprising a first surface having two areas, one area being adjacent to one apex portion seal means of the working face and the other area being adjacent to the other apex portion seal means of the working face, each area of the first surface extending substantially across the rotor from one end face to the other, the first surface having a lesser clearance from the regions of minimum radius than the remainder of the working face, a second surface having a greater clearance than the first surface from the regions of minimum radius, and a third surface formed by a channel in the second surface that has a greater clearance from the regions of minimum radius than the second surface.

2. A rotary combustion engine having a cycle which includes the four phases of intake, compression, expansion and exhaust, the engine comprising an outer body having spaced end walls and a peripheral wall interconnecting the end walls to define, between these walls, a cavity having an axis along which the end walls are spaced, a rotor received within the outer body cavity and supported for relative rotation with respect to the outer body with the axis of the rotor being laterally spaced from but parallel to the axis of the outer body cavity, the rotor having axially-spaced end faces disposed adjacent to and in sealing engagement with the end walls and a plurality of circumferentially-spaced apex portions, each apex portion having seal means disposed in sealing engagement with the inner surface of the peripheral wall to form a plurality of working chambers between the rotor and outer body which vary in volume upon relative rotation of the rotor and outer body, the rotor having working faces interconnecting apex portions and extending from one apex portion to an adjacent apex portion, each working face of the rotor comprising three surfaces, a first surface having the least clearance from the inner surface of the peripheral wall of the outer body, the first surface having two areas, one area being adjacent one apex portion seal means of the working face, and the other area being adjacent the other apex portion seal means of the working face, each area of the first surface extending substantially across the rotor from one end face to the other, a second surface of the working face intermediate the two areas of the first surface, substantially parallel to the first surface, and having a greater clearance from the inner surface of the peripheral wall than the first surface, and a third surface having a greater clearance from the inner surface of the peripheral wall than the second surface, the first surface being raised above the second surface relative to the axis of the rotor, and the third surface being formed by a depression in the second surface.

3. The invention as defined in claim 2, in which the inner surface of the outer body peripheral wall has basically the profile of a two-lobed epitrochoid and the rotor has a substantially triangular profile, and in which the outer body peripheral wall has a cavity for receiving a spark plug, the cavity opening through the eptirochoidal inner surface of the peripheral wall in the vicinity of a cusp of the inner surface such that the trailing area of the first surface of each working face of the rotor when passing across this opening is substantially parallel to the inner surface and in close juxtaposition thereto.

4. The invention as defined in claim 3, in which the dimension of the spark plug cavity opening on the inner surface is substantially less in the direction of relative rotation than the dimension in said direction of each area of the first surface of a working face.

5. The invention as claimed in claim 2, in which the inner surface of the outer body peripheral wall has basically the profile of a two-lobed epitrochoid and the rotor has a substantially triangular profile, and in which the trailing area of the first surface of each rotor working face is so disposed that it is substantially parallel to the inner surface of the peripheral wall and in close juxtaposition thereto just before its associated apex reaches a cusp of the epitrochoid in the direction of the relative rotation.

6. A rotor for rotary combustion engines having an axis about which it rotates, and comprising a pair of spaced end faces substantially perpendicular to its axis, at least three working faces substantially parallel to its axis, at least three apex portions formed by the intersection of adjacent working faces, each working face extending from one apex portion to an adjacent apex portion and comprising three surfaces, a first surface having two areas, one area being adjacent one apex portion of the working face, and the other area being adjacent the other apex portion of the working face, each area of the first surface extending across the rotor from one end face to the other, a second surface of the working face intermediate the two areas of the first surface and substantially parallel to the first surface, and a third surface formed by a channel in the second surface, the first surface being raised above the second surface relative to its distance from the axis of the rotor and the second surface being raised above the third surface relative to its distance from the axis of the rotor.

References Cited in the file of this patent

UNITED STATES PATENTS

| | | |
|---|---|---|
| 1,204,013 | Hanni | Nov. 7, 1916 |
| 1,521,106 | Keim | Dec. 30, 1924 |
| 1,968,113 | Weaver | July 31, 1934 |
| 2,708,428 | Fisher | May 17, 1955 |
| 2,866,417 | Nubling | Dec. 30, 1958 |
| 2,947,290 | Froede | Aug. 2, 1960 |
| 2,988,065 | Wankel et al. | June 13, 1961 |

FOREIGN PATENTS

| | | |
|---|---|---|
| 767,917 | France | May 7, 1934 |
| 1,125,876 | France | July 16, 1956 |
| 1,226,573 | France | Feb. 29, 1960 |